(12) United States Patent
Yamakawa et al.

(10) Patent No.: US 6,301,960 B1
(45) Date of Patent: Oct. 16, 2001

(54) THERMO-SENSITIVE FLOW RATE SENSOR

(75) Inventors: Tomoya Yamakawa; Masahiro Kawai, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/456,011

(22) Filed: Dec. 7, 1999

(30) Foreign Application Priority Data

Jun. 10, 1999 (JP) ................................. 11-163927

(51) Int. Cl.[7] ...................................................... G01F 1/68
(52) U.S. Cl. ........................................................ 73/204.26
(58) Field of Search ........................... 73/204.26, 204.17, 73/204.18, 204.23, 204.25

(56) References Cited

U.S. PATENT DOCUMENTS

| | | | |
|---|---|---|---|
| 4,912,974 | 4/1990 | Inada et al. | 73/204.25 |
| 5,024,083 | 6/1991 | Inada et al. | 73/204.26 |
| 5,452,610 * | 9/1995 | Kleinhans et al. | 73/204.26 |
| 5,465,618 | 11/1995 | Yasui et al. | 73/204.27 |
| 5,827,960 * | 10/1998 | Sultan et al. | 73/204.26 |
| 5,936,157 * | 8/1999 | Ymashita et al. | 73/204.26 |
| 5,965,811 * | 10/1999 | Kawai et al. | 73/204.26 |

FOREIGN PATENT DOCUMENTS

| | | | |
|---|---|---|---|
| 4-230808 | 8/1992 | (JP) | G01F/1/68 |
| 10/293052 | 11/1998 | (JP) | G01F/1/68 |

* cited by examiner

Primary Examiner—Benjamin R. Fuller
Assistant Examiner—Jewel V. Thompson
(74) Attorney, Agent, or Firm—Sughrue, Mion, Zinn, Macpeak & Seas, PLLC

(57) ABSTRACT

A thermo-sensitive flow rate sensor includes a flow rate detecting device that has a plurality of flow rate detecting diaphragms, each of which is provided with heating portions and temperature detecting portions. The plurality of flow rate detecting diaphragms are arranged in a direction perpendicular to a direction of flow of a fluid to be measured. Each of the flow rate detecting diaphragms is formed and placed so that the length of a longer side thereof is two times the length of a shorter side or more, and that the longer side thereof extends along the direction of flow of the fluid to be measured. Each of the flow rate detecting diaphragms has at least one of the heating potions and at least one of the temperature detecting portions, which are arranged in the direction of flow of the fluid to be measured.

8 Claims, 14 Drawing Sheets

THERMO-SENSITIVE FLOW RATE SENSOR

BACKGROUND OF THE INVENTION

1. Field of the Invention

The present invention relates to a flow rate detecting device, which has a heating element and is used for measuring the flow velocity or flow rate of a fluid according to a heat transfer phenomenon where a heat is transferred to the fluid from the heating element or from a part heated by the heating element, and to a flow rate sensor employing such a flow rate detecting device. The present invention is applied to, for example, a flow rate sensor for use in measuring an intake air amount of an internal combustion engine.

2. Description of the Related Art

FIGS. 15 and 16 are a plan view and a sectional side view of a conventional flow rate detecting device described in, for example, Japanese Unexamined Patent Publication No. 4-230808 Official Gazette, respectively. Incidentally, the Japanese Unexamined Patent Publication No. 4-230808 Official Gazette describes the flow rate detecting device as a diaphragm sensor.

In FIGS. 15 and 16, reference numeral 101 designates a plate-like substrate constituted by a silicon semiconductor. In the central part of the rear surface portion of this plate-like substrate 101, a cavity 110 having a trapezoidal section is formed by, for instance, anisotropic etching in such a manner as not to reach the surface thereof. In the front surface portion of the plate-like substrate 101, a thin-film-like flow rate detecting diaphragm 102 (hereunder referred to simply as a diaphragm) is integrally formed. Further, a thin film heating element 103 is formed in the central part of the front surface portion of this diaphragm 102. Thin film temperature detecting elements 104 and 105 are formed on both sides of the heating element 103 in such a way as to be apart from each other by a predetermined distance and to be placed symmetrically with respect to the heating element 103. Further, each of elongated holes 106a and 106b penetrating the diaphragm 102 are bored in a portion between the heating element 103 and a corresponding one of the temperature detecting elements 104 and 105 along the longitudinal direction thereof. Moreover, two lines of plural rectangular holes 107a and 107b penetrating the diaphragm 102 are bored along the longitudinal direction of the heating element 103 outside the temperature detecting elements 104 and 105, respectively. Similarly, holes 108c and 108d penetrating the diaphragm 102 are bored in portions provided on both sides in the longitudinal direction of the heating element 103. Furthermore, holes 109c and 109d penetrating the diaphragm are bored in portions provided on both sides in the longitudinal direction of each of the temperature detecting elements 104 and 105. These holes are formed by using photolithography and wet etching (or dry etching) techniques.

When an energizing current for the heating element 103 is controlled by using such a conventional flow rate detecting device so that the temperature of the heating element 103 is higher than a to-be-measured fluid by a predetermined value, the temperatures of the temperature detecting elements 104 and 105 are equal to each other in the case that no movement of the to-be-measured fluid occurs (that is, the flow velocity=0).

When an air flow moves in the direction of an arrow A, the temperature of the temperature detecting element 104 positioned at the upstream-side place is lower than that thereof in the case that the flow velocity=0. As the flow velocity increases, the temperature thereof falls. Conversely, the temperature of the temperature detecting element 105 positioned at the downstream-side place does not lower to the temperature exhibited by the upstream-side temperature detecting element 104 at the same flow velocity. Thus, if a quantity corresponding to the difference in temperature between the temperature detecting elements 104 and 105 is obtained by incorporating the temperature detecting elements 104 and 105 into a Wheatstone bridge circuit (not shown), the flow velocity of the to-be-measured fluid can be measured.

The Japanese Unexamined Patent Publication No. 4-230808 Official Gazette describes the following advantages of the conventional flow rate detecting device owing to provisions of holes in the diaphragm 102. Namely, variation in output thereof due to the deposition of dusts is decreased as a result of the facts that heat flow from the heating element 103 to the temperature detecting elements 104 and 105 is decreased and that thus, the temperatures of the temperature detecting elements 104 and 105 are lowered. Moreover, the sensitivity of the conventional flow rate detecting device is enhanced because heat generated in the heating element 103 and transmitted to the plate-like substrate 101 is reduced.

Meanwhile, when the flow velocity of the fluid to be measured increases, or when pressure is applied to the flow rate detecting diaphragm 102, or when the flow rate detecting diaphragm 102 undergoes vibrations of large amplitudes, stress occurs in the diaphragm 102. At worst, the diaphragm 102 breaks.

Further, the conventional flow rate detecting device is constructed so that the holes are positioned in the vicinity of the upstream side of the heating element 103 and the temperature detecting elements 104 and 105. Thus, in the case of the long-term use of the flow rate detecting device, dusts contained in the fluid to be measured are deposited on the surface in the direction of thickness of the substrate at end portions of the holes. This results in change of the manner of flow of the fluid to be measured. Consequently, the conventional flow rate detecting device has a drawback in that the detection characteristics thereof vary.

Even if the holes bored in the diaphragm 102 are eliminated so as to prevent variation in the detection characteristics, the diaphragm 102 sometimes has insufficient strength.

When such a flow rate detecting device is employed as, for example, an intake air amount sensor to be used for controlling fuel supply to an internal combustion engine of an automobile, the following problems occur. The internal combustion engine of an automobile generates vibrations corresponding to 40 G to 50 G of force. Further, the flow velocity of the intake air sometimes reaches 200 m/s or more. Furthermore, when a back fire occurs, a pressure close to 2 atms may be applied to the flow rate detecting device. When the conventional flow rate detecting device is subject to such mechanical stress, this device is in danger of being broken.

Conversely, if the thickness of the diaphragm is increased to enhance the strength thereof, the heat capacity of the diaphragm increases. Moreover, the heat responsibility of the diaphragm is decreased. Consequently, the conventional flow rate detecting device cannot follow the variation in the flow rate.

SUMMARY OF THE INVENTION

The present invention is accomplished to solve the aforementioned problems. Accordingly, an object of the present invention is to provide a flow rate sensor with high reliability, which has a flow rate detecting device provided with diaphragms each having enhanced strength.

To achieve the foregoing object, according to an aspect of the present invention, there is provided a thermo-sensitive flow rate sensor including a flow rate detecting device that has a plurality of flow rate detecting diaphragms, each of which is provided with heating portions and temperature detecting portions. The plurality of flow rate detecting diaphragms are arranged in a direction perpendicular to a direction of flow of a fluid to be measured. Each of the flow rate detecting diaphragms is formed and placed so that the length of a longer side thereof is two times the length of a shorter side or more, and that the longer side thereof extends along the direction of flow of the fluid to be measured. Each of the flow rate detecting diaphragms has at least one of the heating potions and at least one of the temperature detecting portions, which are arranged in the direction of flow of the fluid to be measured.

According to another aspect of the present invention, there is provided a thermo-sensitive flow rate sensor including a flow rate detecting device that has flow rate detecting diaphragms, each of which has a heating portion and a temperature detecting portion. The flow rate detecting diaphragms are arranged in the direction of flow of a fluid to be measured. Each of the flow rate detecting diaphragms is formed and placed so that the length of a longer side thereof is two times a length of a shorter side or more, that the longer side thereof extends in a direction perpendicular to the direction of flow of the fluid to be measured, and that the thickness thereof is not more than 1 μm. An upstream-side one of the flow rate detecting diaphragms has the corresponding heating portion and the corresponding temperature detecting portion placed at an upstream side thereof. A downstream-side one of the flow rate detecting diaphragms has the corresponding heating portion and the corresponding temperature detecting portion placed at a downstream side thereof. Each of the heating portions comprises thermo-sensitive resistors. The thermo-sensitive resistors of each of the heating portions are connected in series or in parallel. This sensor uses a signal representing an amount corresponding to the difference in temperature between the temperature detecting portion provided in the upstream-side flow rate detecting diaphragm and the temperature detecting portion provided in the downstream-side flow rate detecting diaphragm as a flow rate signal.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, the preferred embodiments of the present invention will be described in detail by referring to the accompanying drawings.

First Embodiment

Figure 1:
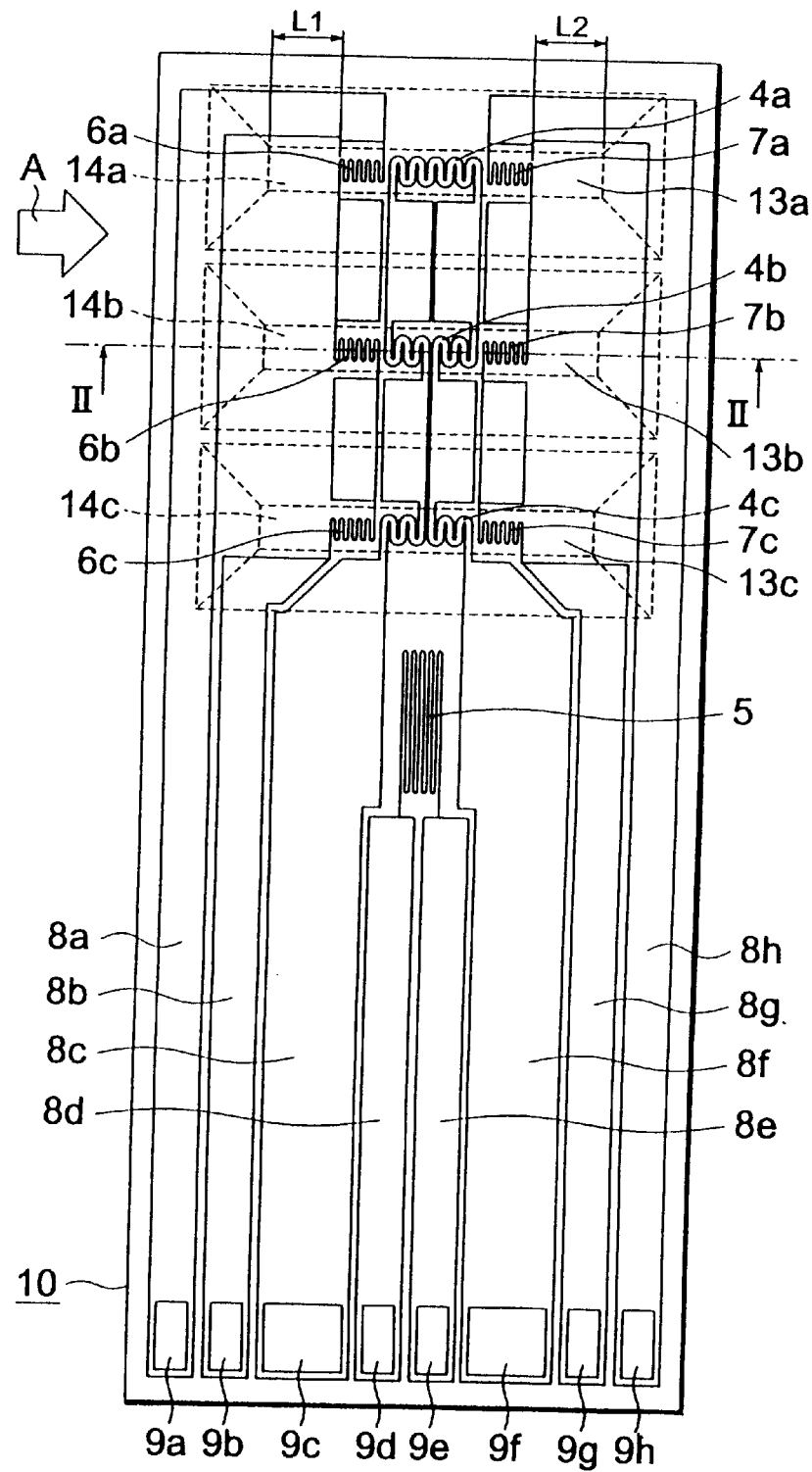
FIG. 1 is a plan view of a flow rate detecting device used in a thermo-sensitive flow rate sensor which is a first embodiment of the present invention.
Figure 2:
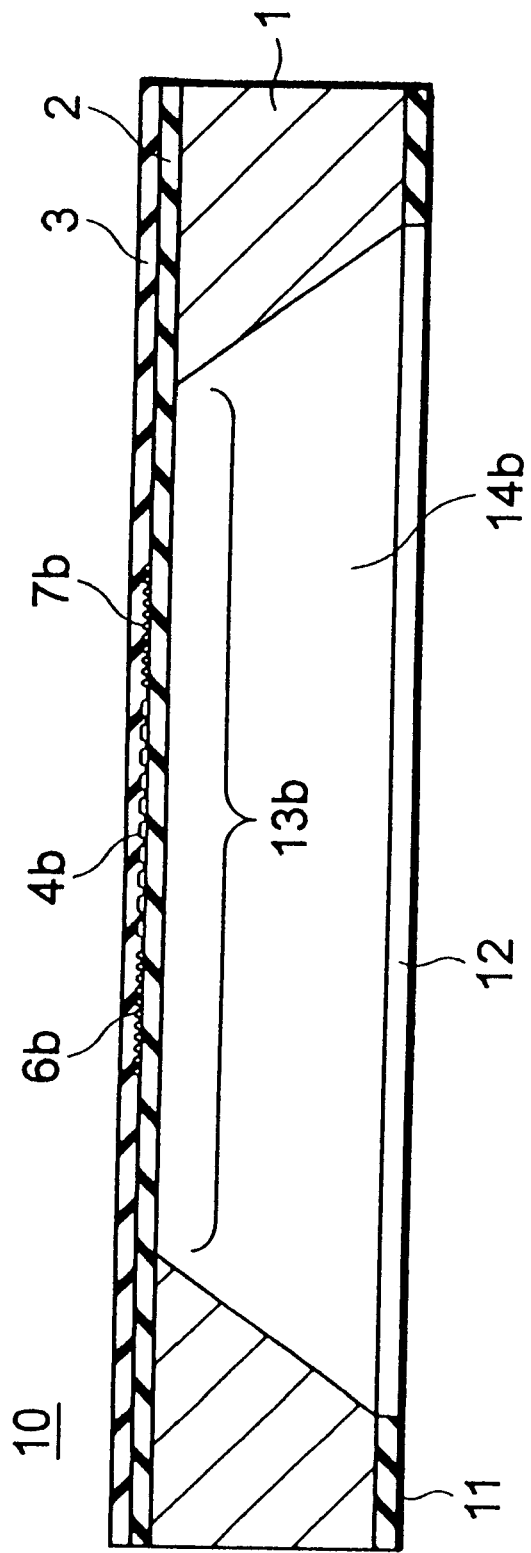
FIG. 2 is a sectional view taken in the direction of arrows on line II—II of FIG. 1.

FIG. 1 is a plan view of a flow rate detecting device used in a thermo-sensitive flow rate sensor which is the first embodiment of the present invention. FIG. 2 is a sectional view taken in the direction of arrows on line II—II of FIG. 1.

As shown in FIGS. 1 and 2, a plate-like substrate 1 is constituted by a silicon substrate about 0.4 mm thick. Further, a 0.5-μm-thick insulative-supporting film 2 made of silicon nitride is formed on a surface 1a of the plate-like substrate 1 by performing a method, such as sputtering, vapor deposition or CVD. Moreover, heater resistors 4a to 4c each constituted by a thermo-sensitive resistor film, such as a platinum film, which serve as a heating portion, temperature detecting resistors 6a to 6c and 7a to 7c serving as a temperature detecting portion, and a fluid temperature detecting resistor 5 are formed on the supporting film 2. These heater resistors 4a to 4c, the temperature detecting resistors 6a to 6c and 7a to 7c and the fluid temperature detecting resistor 5 are configured in the following process in such a way as to form a current path. First, a thermo-sensitive resistor film, such as a platinum film, having a thickness of, for instance, 0.1 μm is formed on the supporting film 2 by using a vapor deposition or sputtering method. Then, patterning is performed on this thermo-sensitive resistor film by employing a photolithographic method and a wet (or dry etching) method. Two groups of the temperature detecting resistors 6a to 6c and 7a to 7c are provided on both sides of the heater resistors 4a to 4c, respectively. The fluid temperature detecting resistor 5 is provided apart from the heater resistors 4a to 4c.

Furthermore, an insulative protective coat 3 constituted by a 0.4-μm thick film made of silicon nitride is formed on the heater resistors 4a to 4c, the temperature detecting resistors 6a to 6c, 7a to 7c and the fluid temperature detecting resistor 5 by performing the sputtering or CVD method.

The heater resistors 4a to 4c are connected in series and connected through lead patterns 8c and 8f to electrodes 9c and 9f for electrically connecting the flow rate detecting device 10 to an external circuit. Further, the fluid temperature detecting resistor 5 is connected through lead patterns 8d and 8e to electrodes 9d and 9e for electrically connecting the flow rate detecting device 10 to an external circuit. Moreover, similarly, the temperature detecting resistors 6a to 6c are connected in series and further connected through lead patterns 8a and 8b to electrodes 9a and 9b. Further, the temperature detecting resistors 7a to 7c are connected in series and further connected through lead patterns 8g and 8h to electrodes 9g and 9h.

These lead patterns 8a to 8h are simultaneously formed when the patterning is performed to form the heater resistors 4a to 4c, the temperature detecting resistors 6a to 6c and 7a to 7c and the fluid temperature detecting resistor 5. Further, the protective films 3 formed on the electrodes 9a to 9d are removed so as to be connected to an external circuit by wire-bonding.

Further, cavities 14a to 14c are formed by partly removing the plate-like substrate 1 placed under the heater resistors 4a to 4c and the temperature detecting resistors 6a to 6c and 7a to 7c, so that the flow rate detecting diaphragms 13a to 13c are constructed. These diaphragms 13a to 13c are formed as follows. First, a back-surface protecting film 11 constituted by an oxide film is formed on the opposite surface of the plate-like substrate 1, which is opposite to the surface thereof on which the supporting film 2 is formed. Subsequently, etching holes 12 are formed by removing the back surface protecting film 11 by, for instance, a photolithographic method. Thereafter, cavities 14a to 14c are formed by removing exposed portions of the plate-like substrate 1, which have trapezoidal sections and extend from the opposite surface to the supporting film 2, by, for example, alkali etching.

In FIG. 1, an arrow A indicates a positive direction of flow of a fluid to be measured. Three flow rate detecting diaphragms 13a to 13c are placed so that the portions thereof at the side of the protective film 3 are exposed to the fluid to be measured, that a longer side of each of the diaphragms 13a to 13c extends along the direction A of flow of the fluid to be measured and that the diaphragms 13a to 13c are arranged in a direction perpendicular to the direction A of the flow of the fluid to be measured. The size of each of the three diaphragms 13a to 13c is 1500 μm×200 μm. The thickness of a portion, in which no resistors are constructed, of each of the diaphragms 13a to 13c is 0.9 μm. Further, on each of the diaphragms 13a to 13c, the temperature detecting resistors 6a to 6c are placed at the upstream side of the heater resistors 4a to 4c, respectively. Moreover, the temperature detecting resistors 7a to 7c are placed at the downstream side of the heater resistors 4a to 4c, respectively.

Figure 3:
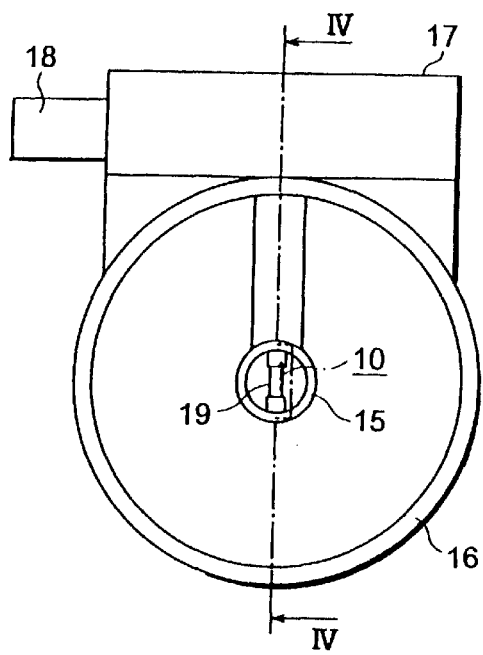
FIG. 3 is a front view of the thermo-sensitive flow rate sensor which is the first embodiment of the present invention.
Figure 4:
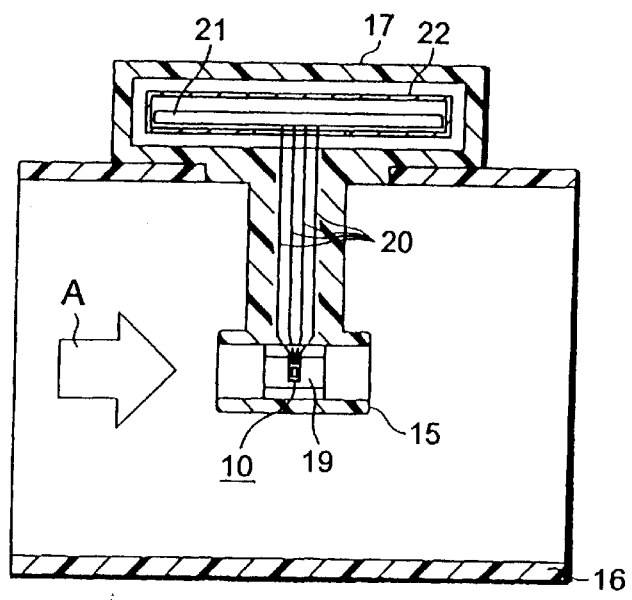
FIG. 4 is a sectional view taken in the direction of arrows on line IV—IV of FIG. 3.

FIGS. 3 and 4 are a front view and a longitudinal sectional view of the thermo-sensitive flow rate sensor using the flow rate detecting device 10, respectively.

As shown in FIGS. 3 and 4, this flow rate sensor comprises a cylindrical main passage 16 serving as a passage through which a fluid to be measured flows, and a cylindrical detecting pipe 15 coaxially disposed in this main passage 16. The flow rate detecting device 10 shown in FIGS. 1 and 2 is attached to the surface of the plate-like supporting element 19 disposed in the detecting pipe 15 so that the surface of the flow rate detecting device 10 is nearly parallel to the direction A of flow of the fluid to be measured. This flow rate detecting device 10 is placed so that the portion thereof provided at the side of the protective film 3 is exposed to the fluid to be measured and that a longer side of each of the diaphragms 13a to 13c extends in the direction A of flow of the fluid.

Furthermore, a detecting circuit board 21 serving as a detecting circuit is accommodated in a case 17. The flow rate detecting device 10 is electrically connected to the detecting circuit board 21 through the lead wire 20. Moreover, a connector 18 for supplying power to the flow rate sensor and for taking an output signal to an external circuit is provided in the case 17. A shielding member 22 is disposed in such a manner as to cover the detecting circuit board 21 so that the detecting circuit board 21 is protected from external disturbance, such as electromagnetic waves.

Incidentally, the configuration of the flow rate sensor illustrated in FIGS. 3 and 4 is the same as those of flow rate sensors of other embodiments that will be described later.

Figure 5:
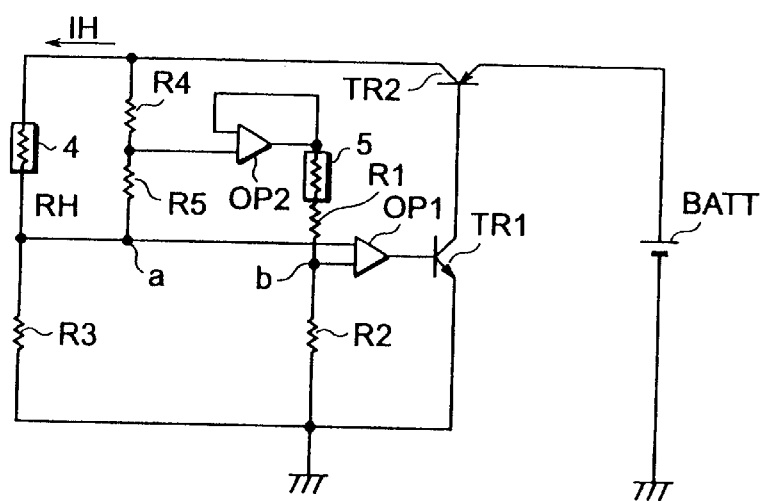
FIG. 5 is a circuit diagram showing a constant temperature difference circuit provided in the thermo-sensitive flow rate sensor which is the first embodiment of the present invention.

In this flow rate detecting device 10 sensor, the heater resistors 4a to 4c are controlled by the constant temperature difference drive circuit shown in FIG. 5 in such a manner as to have a resistance value by which the average temperature of the heater resistors has a predetermined value. The detecting circuit is constituted by a bridge circuit including the fluid temperature detecting resistor 5 and the heater resistor 4 (in this case, the heater resistors 4a to 4c are connected in series and thus shown as one heater resistor 4, for convenience). In this figure, reference characters R1, R2, R3, R4 and R5 designate fixed resistors. Reference characters OP1 and OP2 denote operational amplifiers. Reference characters TR1 and TR2 designate transistors, and BATT denotes a power supply. Further, the composing elements of this circuit except the fluid temperature detecting resistor 5 and the heater resistor 4 are configured on the detecting circuit board 21.

This detecting circuit acts so that the electric potential at points a and b shown in FIG. 5 are nearly equal to each other. Moreover, the composing resistors of the bridge circuit are set so that the temperature of the heater resistor 4 is higher than the temperature of the fluid temperature detecting resistor 5 by a predetermined value (for instance, 100° C.), and this detecting circuit controls a heating current IH for the heater resistor 4. When the flow velocity of the fluid to be measured increases, an amount of heat transferred to this fluid from the heater resistor 4 increases. Thus, when the average temperature of the heater resistor 4 is maintained at a predetermined value, the heating current IH increases.

On the other hand, each of the temperature detecting resistors 6a to 6c and 7a to 7c obtains an output corresponding to the temperature thereof by a circuit (not shown). Further, a signal representing the difference between the outputs of these resistors is used as an output of the flow rate sensor. Namely, when the fluid moves in the direction of the arrow A (that is, the positive direction) in FIG. 1, the temperature of the temperature detecting resistors 6a to 6c is lower than that of the temperature detecting resistors 7a to 7c. Conversely, when the fluid moves in a direction (that is, the negative direction) opposite to the direction of the arrow A, the temperature of the resistors 6a to 6c is higher than that of the temperature detecting resistors 7a to 7c.

Figure 6:
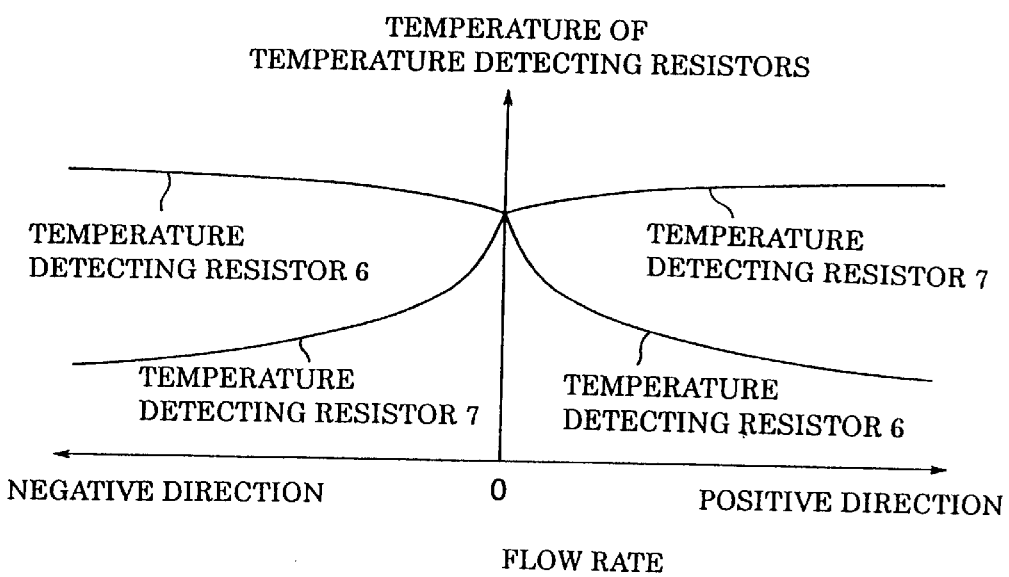
FIG. 6 is a graph illustrating the relation between the flow rate in the thermo-sensitive flow rate sensor, which is the first embodiment of the present invention, and the temperature of the temperature detecting element.

FIG. 6 shows the average temperature of the temperature detecting resistors 6a to 6c and 7a to 7c correspondingly to the flow rate. Thus, the flow rate of the fluid and the direction of flow thereof are detected by using the difference between outputs respectively corresponding to the temperature of the temperature detecting resistors 6a to 6c and the temperature of the temperature detecting resistors 7a 7c as an output of the low rate sensor.

Incidentally, the temperatures of the temperature detecting resistors 6a to 6c and 7a to 7c are detected by methods of applying a predetermined constant voltage or current to a group of the resistors 6a to 6c and another group of the resistors 7a to 7c.

Hereunder, the maximum stress and deflection caused in the diaphragms at the time of applying a uniform load, such as a pressure, to the diaphragms are studied.

Figure 7:
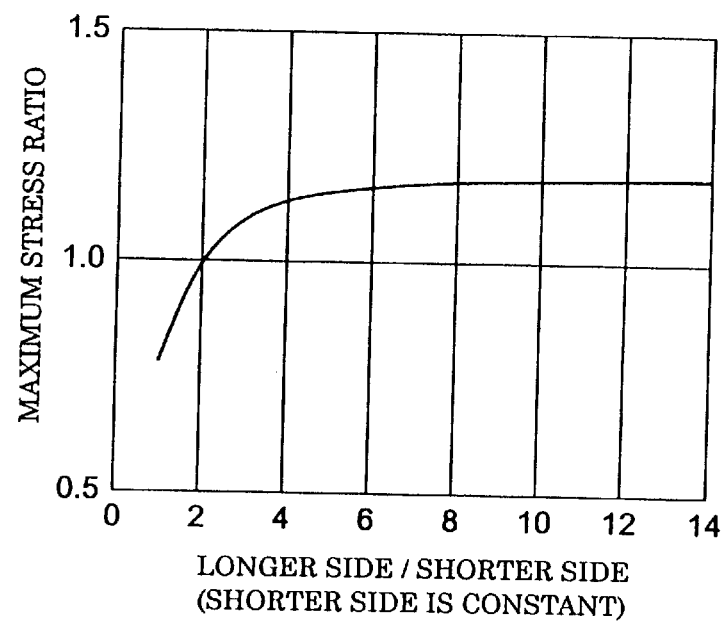
FIG. 7 is a graph illustrating the relation between the ratio of the longer side to the shorter side of the diaphragm and the maximum stress caused in the diaphragm.

FIG. 7 is a graph illustrating the relation between the aspect ratio of each of the diaphragms and the maximum stress caused therein in the case that the length of the shorter side of each of the diaphragm is constant. The abscissas of this graph indicate the ratio of the length of the longer side of each diaphragm to that of the shorter side thereof in the case that the length of the shorter side is constant and that the length of the longer side is changed. The ordinates of this graph indicate the maximum stress caused when a uniform load is imposed on the surface of each diaphragm, by setting the maximum stress at 1 when the ratio of the length of the longer side to the length of the shorter side =2.

As is seen from FIG. 7, the increasing rate of the maximum stress decreases in the case that the ratio of the length of the longer side to the length of the shorter side is not less than 2, in comparison with the case that such a ratio is less than 2. Therefore, in the case that the area of the diaphragm is increased when the strength of the diaphragm is not largely decreased, it is more preferable to increase the length of the longer side thereof, as compared with the case of increasing the length of the shorter side thereof. Further, if the ratio of the length of the longer side to the length of the shorter side $\geq 2$, a reduction in the strength of the diaphragm relative to an increase in the area thereof can be decreased.

Figure 8:
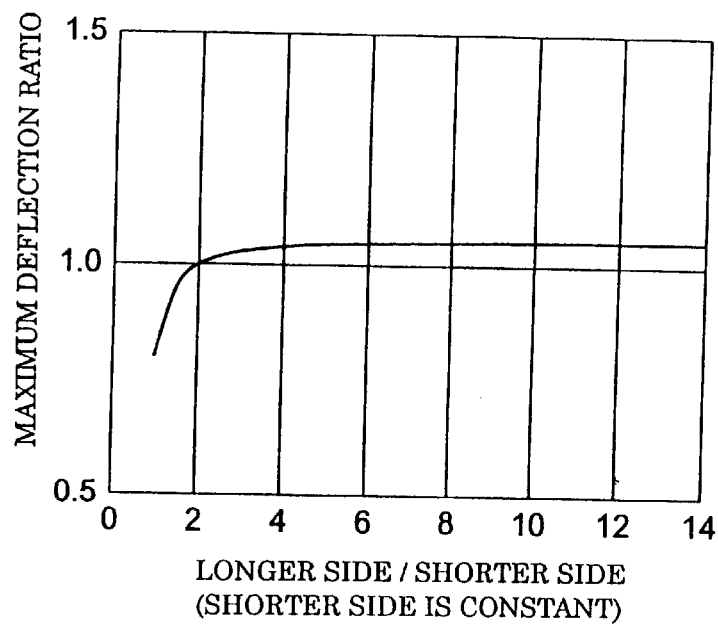
FIG. 8 is a graph illustrating the relation between the ratio of the longer side to the shorter side of the diaphragm and the maximum deflection caused in the diaphragm.

FIG. 8 is a graph illustrating the relation between the aspect ratio of each of the diaphragms and the maximum deflection caused therein in the case that the length of the shorter side of each of the diaphragm is constant. The abscissas of this graph indicate the ratio of the length of the longer side of each diaphragm to that of the shorter side thereof under the same conditions, similarly as in FIG. 7. The ordinates of this graph indicate the maximum deflection caused when a uniform load is imposed on the surface of each diaphragm, by setting the maximum stress at 1 when the ratio of the length of the longer side to the length of the shorter side =2.

As is seen from FIG. 8, the increasing rate of the maximum deflection decreases in the case that the ratio of the length of the longer side to the length of the shorter side is not less than 2, in comparison with the case that such a ratio is less than 2. Therefore, in the case that the area of the diaphragm is increased when the deflection of the diaphragm is not largely increased, it is more preferable to increase the length of the longer side thereof, as compared with the case of increasing the length of the shorter side thereof. Further, if the ratio of the length of the longer side to the length of the shorter side $\geq 2$, an increase in the deflection of the diaphragm relative to an increase in the area thereof can be decreased.

As is understood from the foregoing description of this embodiment, when securing a predetermined area of each of the diaphragms, the strength thereof against an external force is increased and the deflection thereof is decreased by setting the length of the longer side thereof to be twice the length of the shorter side thereof or longer.

Further, it is favorable for securing the high durability of the diaphragm that the stress and deflection caused therein are small. Thus, a highly reliable flow rate sensor is obtained by providing rectangular diaphragms, each of which has a longer side whose length is twice the length of a shorter side or longer, therein.

According to the first embodiment, the diaphragms 13a to 13c are placed so that the longer sides thereof extend along the direction of flow of the fluid to be measured. Thus, the distance L1 between the upstream-side and downstream-side end portions of each of the temperature detecting resistors 6a to 6c and 7a to 7c and the distance L2 between the upstream-side and downstream-side end portions of the diaphragms 13a to 13c are set at large values. Therefore, a broad temperature distribution in the direction parallel to the flow of the to-be-measured fluid flowing on the diaphragms 13a to 13c is established. Consequently, the large difference in temperature between a group of the temperature detecting resistors 6a to 6c and another group of the temperature detecting resistors 7a to 7c is realized. The flow rate detecting sensitivity of the sensor is enhanced. Incidentally, even in this case, if a single flow rate detecting diaphragm is provided in the sensor, a flow rate detecting range in the direction perpendicular to the flow of the fluid to be measured (namely, in the direction of the shorter side of the diaphragm) is narrow. Thus, in the case of the first embodiment, three flow rate detecting diaphragms 13a to 13c are arranged in the direction perpendicular to the flow of the fluid to be measured, so that the average radial flow velocity in the passage is measured. Consequently, the flow rate detecting accuracy is enhanced.

Furthermore, in each of the flow rate detecting diaphragms 13a to 13c, a corresponding one of the temperature detecting resistors 6a to 6c is provided at the upstream side of a corresponding one of the heater resistors 4a to 4c. Further, a corresponding one of the temperature detecting resistors 7a to 7c is provided at the downstream side thereof. Thus, a signal representing the temperature at the upstream side of the heater resistors and a signal representing the temperature at the downstream side thereof are obtained from the flow rate detecting diaphragms 13a to 13c. Consequently, the sensitivity of the flow rate sensor is enhanced. Moreover, because the diaphragm consists of three flow rate detecting diaphragms 13a to 13c, the dimensions of each of the three diaphragm are reduced. Consequently, the strength of the diaphragms is enhanced.

Additionally, each of the flow rate detecting diaphragms 13a to 13c is formed in such a way as to have a size of 1500 $\mu$m×200 $\mu$m. Thus, the strength of the diaphragms against an external force is enhanced.

Consequently, the strength of the diaphragm of the flow rate detecting device 10 is increased, so that a highly reliable flow rate sensor is obtained.

The achievement of enhancement of the strength of the flow rate detecting diaphragms means that thinner diaphragms are obtained in the case of obtaining the predetermined strength of the diaphragms.

The thermal time constant of a diaphragm is determined according to the specific heat, specific gravity and volume of the material of the diaphragm. Thus, when the thickness of the diaphragm is reduced, the thermal time constant is decreased. Consequently, the responsibility of the flow rate sensor is enhanced. For instance, when this flow rate sensor is employed as an intake air amount sensor for use in an automobile, the intake air is a pulsating flow having a frequency of tens to hundreds hertz and sometimes includes a reverse flow. In the case of such a use, the flow rate sensor should have a quick response so as to accurately obtain an intake air amount. Results of experiments performed by the inventor of the present invention reveal that, if the thickness of the diaphragm is not more than 1 $\mu$m, an output of the sensor following an intake air pulsation corresponding to the engine is obtained.

The first embodiment realizes a thinner diaphragm, as compared with the diaphragm of the conventional flow rate sensor. Moreover, the heat capacity of the diaphragm is reduced. Thus, the present invention realizes a flow rate sensor, which can be applied to an intake air amount sensor for use in an engine of an automobile.

Furthermore, the heater resistors 4a to 4c are connected in series. Thus, it is sufficient that the sensor has only one control circuit for controlling heating currents to be supplied to the heater resistors 4a to 4c. Namely, the sensor has only one constant temperature difference drive circuit, which is shown in FIG. 5. Thus, the number of electrodes is not increased. Consequently, as compared with the conventional flow rate sensor, the number of man-hours need for performing wire-bonding and so on is not increased.

Similarly, the temperature detecting resistors 6a to 6c are connected in series and the temperature detecting resistors 7a to 7c are connected in series, so that the sensor has only a pair of upstream-side and downstream-side temperature detecting circuits for detecting the temperature of the temperature detecting resistors. Thus, as compared with the conventional flow rate sensor, the number of temperature difference detecting circuits is not increased.

Further, in a process of manufacturing the flow rate detecting device 10 described in this first embodiment, a plurality of diaphragms are formed at a time at the same etching step, even in the case that the plurality of diaphragms are provided in the flow rate detecting device 10. Thus, the number of steps is not increased, in comparison with the case of the conventional sensor having a single diaphragm. Consequently, the first embodiment has an advantage in that the manufacturing cost is not increased, as compared with the conventional flow rate sensor.

Incidentally, although the first embodiment is constructed so that the longer sides of the diaphragms 13a to 13c extend in parallel with the direction of flow of the fluid to be measured, similar effects are obtained even when the diaphragms are placed in such a manner as to be slightly inclined to the direction of the flow.

Moreover, although the first embodiment is configured so that the heater resistors 4a to 4c are connected in series, the heater resistors 4a to 4c may be connected in parallel. Furthermore, similarly, each of the groups of the temperature detecting resistors 6a to 6c and 7a to 7c may be connected in parallel.

Additionally, although it has been described that the three flow rate detecting diaphragms are arranged in a direction perpendicular to the direction of the flow of the to-be-measured fluid in the first embodiment, the number of such diaphragms is not limited to three. Similar effects are obtained if a plurality of such diaphragms are arranged in the detecting device.

Second Embodiment

Figure 9:
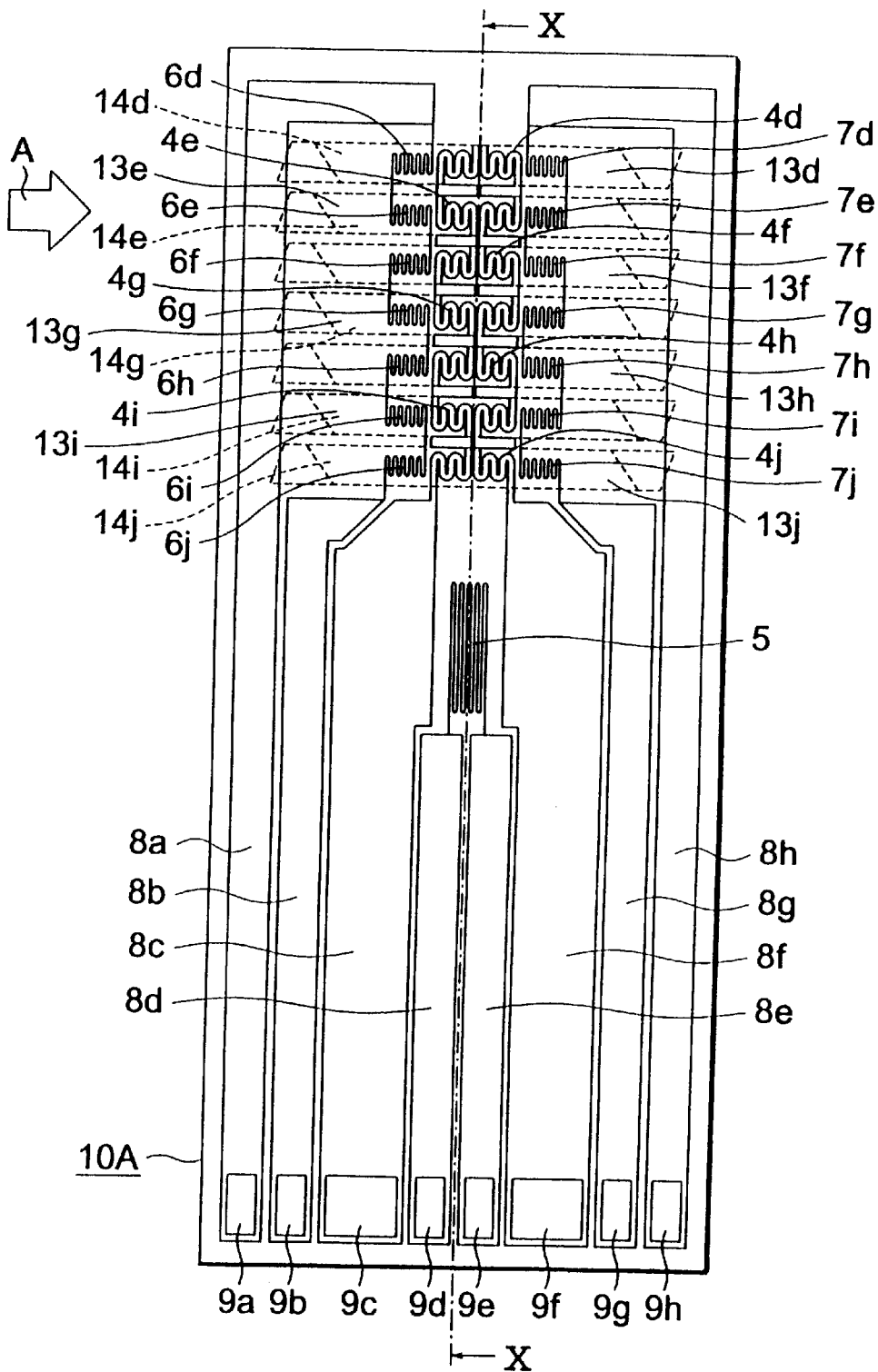
FIG. 9 is a plan view of a flow rate detecting device used in a thermo-sensitive flow rate sensor which is a second embodiment of the present invention.
Figure 10:
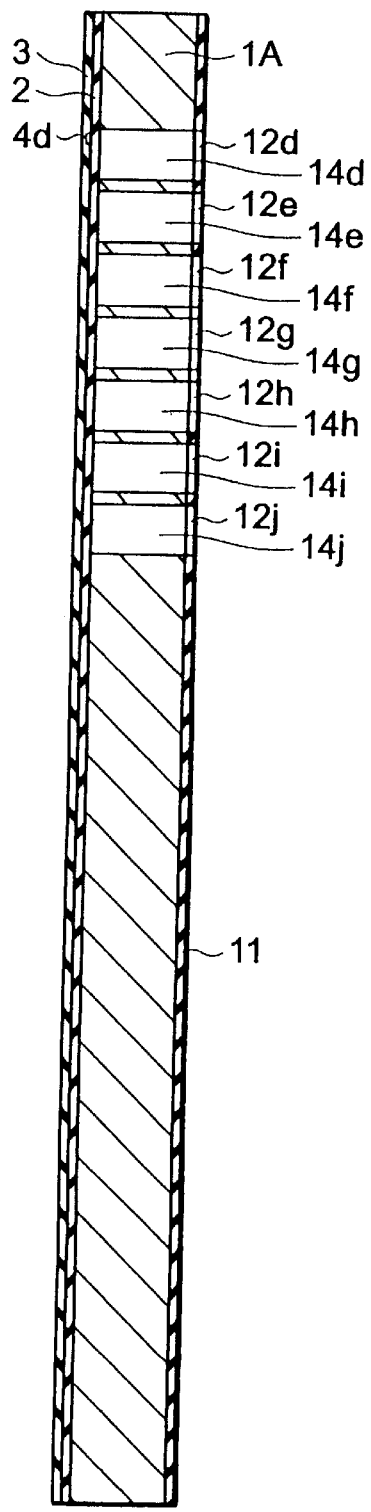
FIG. 10 is a sectional view taken in the direction of arrows on line X—X of FIG. 9.

FIG. 9 is a plan view of a flow rate detecting device used in a thermosensitive flow rate sensor which is a second embodiment of the present invention. FIG. 10 is a sectional view taken in the direction of arrows on line X—X of FIG. 9. Incidentally, reference characters 2, 3, 5, 8a to 8h, 9a to 9h and 11 designate the corresponding composing elements of the first embodiment.

In the case of the second embodiment, a plate-like substrate 1A is a silicon substrate whose plan surface has a crystal orientation of (110) and whose surface in the direction of thickness has a crystal orientation of (111).

Further, first, a supporting film 2, heater resistors 4d to 4j serving as heating portions, upstream-side temperature detecting resistors 6d to 6j serving as the temperature detecting portions, downstream-side temperature detecting portions 7d to 7j serving as the temperature detecting portions, a fluid temperature detecting resistor 5, lead patterns 8a to 8h and a protective film 3 are formed on the plate-like substrate 1A by a method similar to the method described in the description of the first embodiment. Subsequently, a back surface protecting film 11 constituted by an oxide film is formed on a surface opposite to the surface on which the supporting film 2 of the plate-like substrate 1A is formed. Then, etching holes 12d to 12j are formed by partly removing the back surface protecting film 11 by a photolithographic method. Thereafter, etching is performed on this substrate by using an etchant, such as TMAH (Tetra Methyl Ammonium Hydroxide). Then, cavities 14d to 14j are formed by removing parts of the plate-like substrate 1A, which are exposed from the etching holes 12d to 12j, in such a way as to reach the supporting film 2. Consequently, six flow rate detecting diaphragms 14d to 14j are constructed.

The heater resistors 4d to 4j are connected in series. Both ends of each of these resistors are connected through the lead patterns 8c and 8f to the electrodes 9c and 9f, respectively, and thus connected to the constant temperature difference drive circuit. On the other hand, the upstream-side temperature detecting resistors 6d to 6j are connected in series. Both ends of these temperature detecting resistors are connected through the lead patterns 8a and 8b to the electrodes 9a and 9b, respectively, and thus connected to the temperature detecting circuit. Similarly, the downstream-side temperature detecting resistors 7d to 7j are connected in series. Both ends of these temperature detecting resistors are connected to the lead patterns 8g and 8h to the electrodes 9g and 9h, respectively, and thus connected to the temperature detecting circuit.

Incidentally, as illustrated in FIGS. 9 and 10, each of these six flow detecting diaphragms 13d to 13j is formed like a parallelogram in such a manner as to have a longer side extending in parallel with the direction A of the flow. Further, each of these six flow detecting diaphragms is placed in a direction perpendicular to the direction A of the flow so that the adjacent ones of these six flow detecting diaphragms are close to each other. Further, each of the diaphragms has the heater resistor and the temperature detecting resistors formed at the upstream side and the downstream side of the heater resistor.

Further, as a result of the facts that a silicon substrate, whose surface in the direction of thickness thereof has a crystal orientation of (111), is used as the plate-like substrate 1 and that the cavities 14d to 14j are formed by using the etchant, such as TMAH, and performing etching, the longer side portions of the cavities 14d to 14j are formed in such a way as to be nearly perpendicular to the surface of the plate-like substrate 1.

Furthermore, the supporting film 2 is constituted by a 0.5 $\mu$m thick silicon nitride film, while the protective film 3 is constituted by a 0.4 μm thick silicon nitride film. A portion, in which no resistors are formed, of each of the flow rate detecting diaphragms 13d to 13j is 0.9 μm in thickness.

The flow rate sensor using the flow rate detecting device 10A constructed as described above has the following effects in addition to the effects of the first embodiment. Namely, the longer side portion of each of the diaphragms 13d to 13j is etched perpendicularly to the plate-like substrate 1. Thus, many diaphragms are arranged in a direction intersecting (or orthogonal to) the direction A of the flow of the to-be-measured fluid so that adjacent ones of such diaphragms are placed more closely to each other. Consequently, the flow rate detecting range in the direction intersecting the direction A of the flow is broadened. Thus, a highly accurate flow rate sensor is obtained.

Furthermore, the heating resistors 4d to 4j are connected in series, so that only two electrodes are needed, similarly as in the case of the conventional flow rate sensor. Thus, the number of steps of a connecting process is not increased. In addition, the flow rate sensor of this embodiment needs only one constant temperature difference drive circuit.

Moreover, the upstream-side temperature detecting resistors 6d to 6j are connected in series, so that only two electrodes are needed, similarly as in the case of the conventional flow rate sensor. Thus, the number of steps of a connecting process is not increased. Additionally, the flow rate sensor of this embodiment needs only one temperature detecting circuit.

Likewise, the downstream-side temperature detecting resistors 7d to 7j are connected in series, so that only two electrodes are needed, similarly as in the case of the conventional flow rate sensor. Thus, the number of steps of a connecting process is not increased. Additionally, the flow rate sensor of this embodiment needs only one temperature detecting circuit.

Incidentally, although a silicon substrate, whose surface in the direction of thickness thereof has a crystal orientation of (111), is used as the plate-like substrate, and then wet etching is performed on the silicon substrate to thereby form the cavities 14d to 14j etched perpendicularly to the surface of the substrate in the second embodiment, the method of forming such cavities 14d to 14j etched perpendicularly to the surface of the substrate is not limited thereto. A method of partly removing the silicon substrate by performing dry etching may be employed.

Further, although the heater resistors 4d to 4j are connected in series in the second embodiment, the heater resistors 4d to 4j may be connected in parallel. Moreover, each of the groups of the temperature detecting resistors 6d to 6j and 7d to 7j may be connected in parallel.

Third Embodiment

Figure 11:
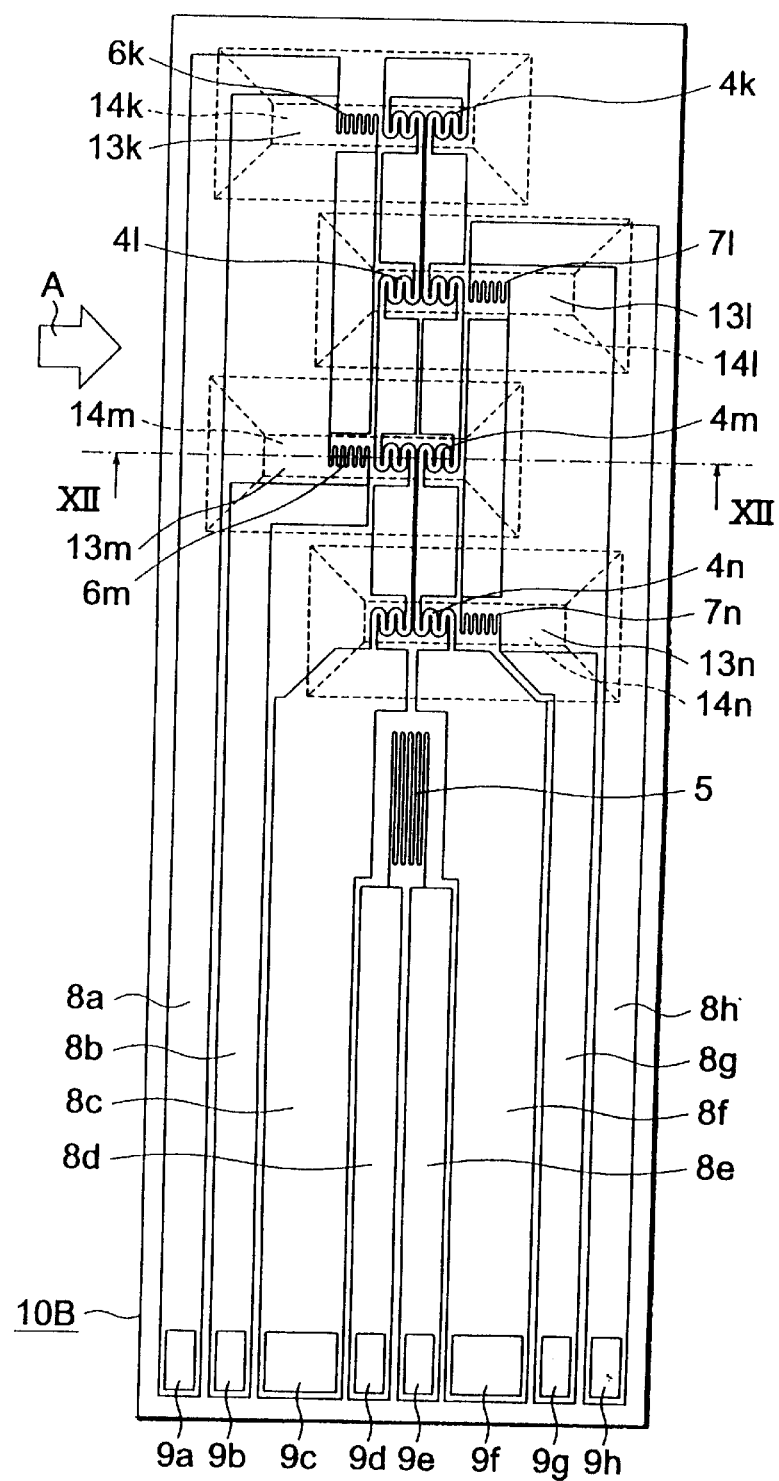
FIG. 11 is a plan view of a flow rate detecting device used in a thermo-sensitive flow rate sensor which is a third embodiment of the present invention.
Figure 12:
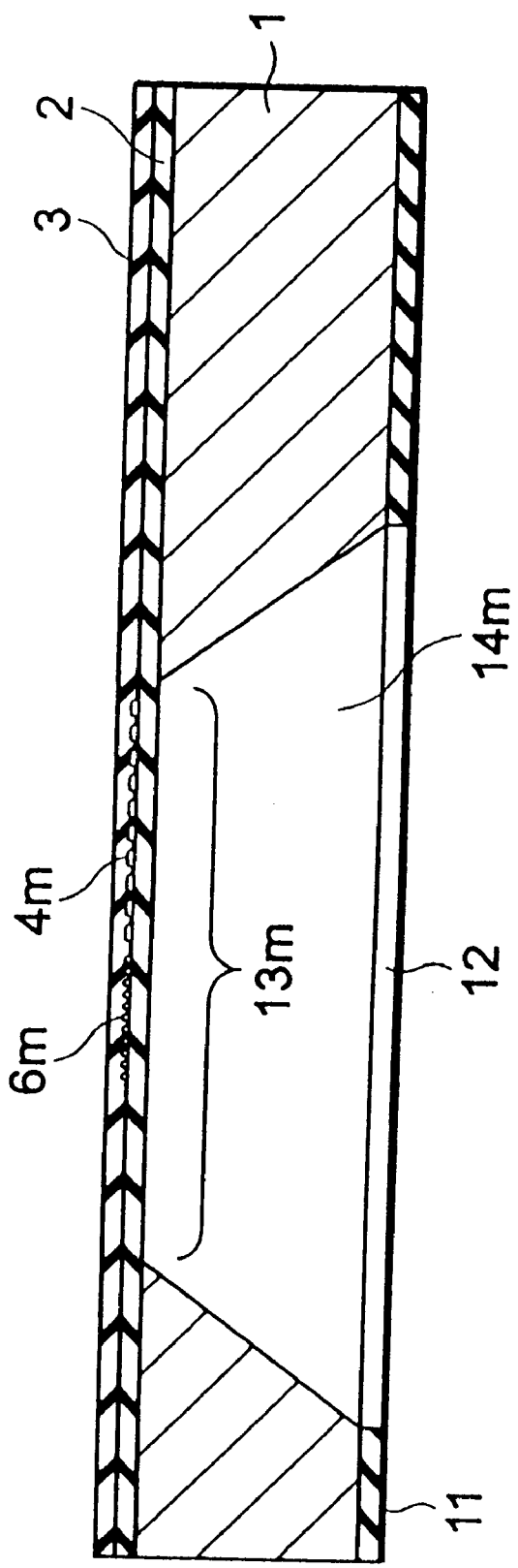
FIG. 12 is a sectional view taken in the direction of arrows on line XII—XII of FIG. 11.

FIG. 11 is a plan view of a flow rate detecting device used in a thermo-sensitive flow rate sensor which is a third embodiment of the present invention. FIG. 12 is a sectional view taken in the direction of arrows on line XII—XII of FIG. 11. Incidentally, reference characters 1 to 3, 5, 8a to 8h, 9a to 9h and 11 designate the corresponding composing elements of the first embodiment.

In the case of the third embodiment, first, a supporting film 2, heater resistors 4k to 4n serving as heating portions, temperature detecting resistors 6k, 6m, 7l and 7n serving as the temperature detecting portions, a fluid temperature detecting resistor 5, lead patterns 8a to 8h and a protective film 3 are formed on the plate-like substrate 1 by a method similar to the method described in the description of the first embodiment. Subsequently, a back surface protecting film 11 constituted by an oxide film is formed on a surface opposite to the surface on which the supporting film 2 of the plate-like substrate 1 is formed. Then, etching holes 12 are formed by partly removing the back surface protecting film 11 by a photolithographic method. Thereafter, alkali etching is performed on this substrate. Then, cavities 14k to 14n are formed by removing parts of the plate-like substrate 1, which are exposed from the etching holes 12, in such a way as to reach the supporting film 2. Consequently, four flow rate detecting diaphragms 13k to 13n are constructed so as to arrange in the direction perpendicular to the direction A of the flow of the fluid to be measured.

Further, the heater resistors 4k and 4m serving as the heating portions, and the temperature detecting resistors 6k and 6m serving as the temperature detecting portions formed at the upstream-side of the heater resistors 4k and 4m are provided in the diaphragms 13k and 13m, respectively. Meanwhile, the heater resistors 4l and 4n serving as the heating portions, and the temperature detecting resistors 7l and 7n serving as the temperature detecting portions formed at the downstream-side of the heater resistors 4l and 4n are provided in the diaphragms 13l and 13n, respectively The heater resistors 4k to 4n are connected in series. Further, the upstream-side temperature detecting resistors 6k to 6m are connected in series. Moreover, the downstream-side temperature detecting resistors 7l to 7n are connected in series.

Incidentally, the supporting film 2 is constituted by a 0.5 μm thick silicon nitride film, while the protective film 3 is constituted by a 0.4 μm thick silicon nitride film. A portion, in which no resistors are formed, of each of the flow rate detecting diaphragms 13k to 13n is 0.9 μm in thickness.

The flow rate sensor using the flow rate detecting device 10B constructed as described above has the following effects. Namely, as described above, the heater resistors 4k and 4m and the temperature detecting resistors 6k and 6m formed at the upstream-side of the heater resistors 4k and 4m are provided in the diaphragms 13k and 13m, respectively. On the other hand, the heater resistors 4l and 4n and the temperature detecting resistors 7l and 7n formed at the downstream-side of the heater resistors 4l and 4n are provided in the diaphragms 13l and 13n, respectively. Thus, the length of the longer side of each of the diaphragms 13k to 13n is reduced. Consequently, the strength of each of the diaphragms is increased still more. Thus, a highly reliable flow rate sensor is obtained.

Additionally, even in the case that each of the diaphragms has the strength equal to that of the diaphragm of the conventional flow rate sensor, the thickness of each of the diaphragms is decreased. Consequently, the present invention provides a flow rate sensor that excels in the responsibility.

Fourth Embodiment

Figure 13:
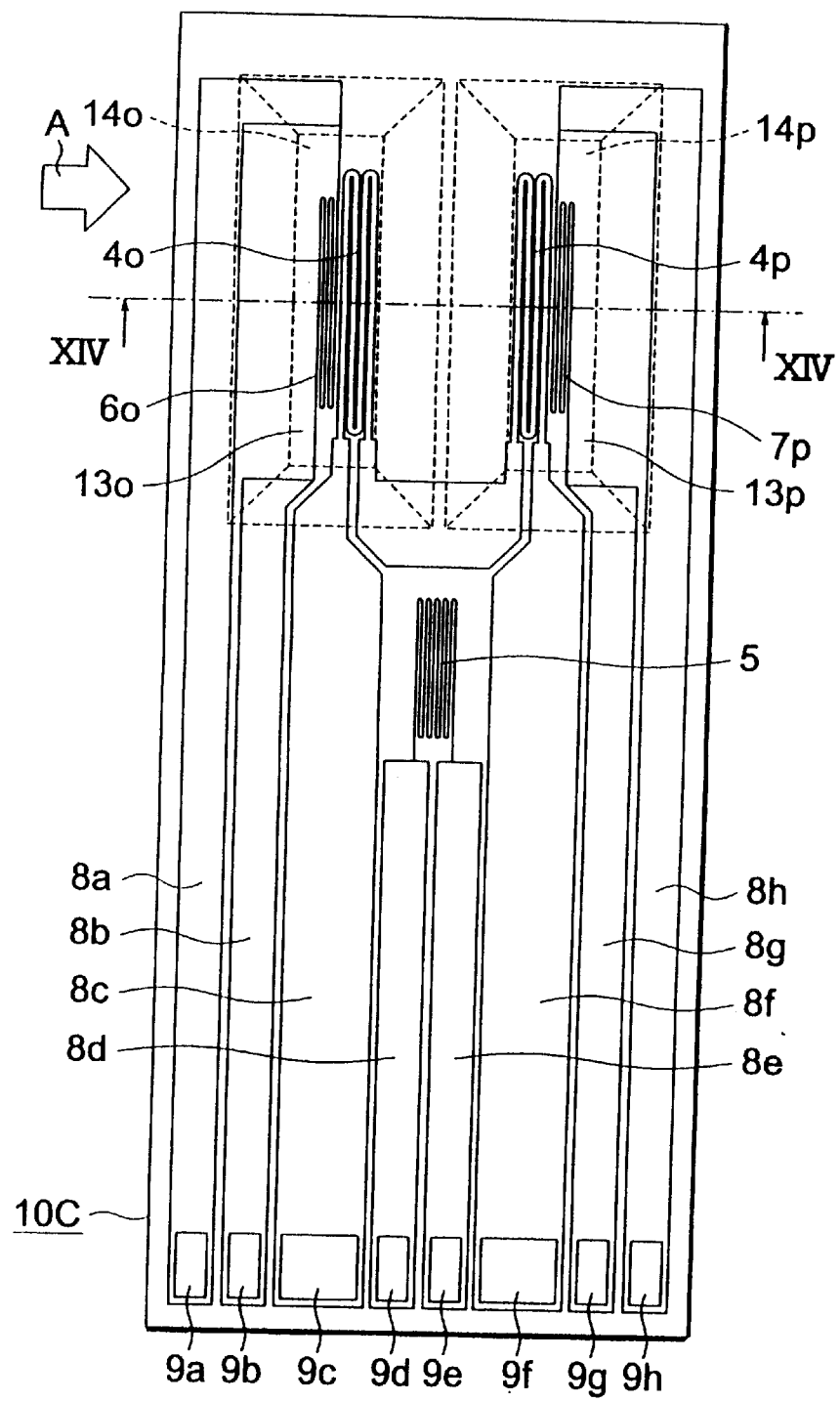
FIG. 13 is a plan view of a flow rate detecting device used in a thermo-sensitive flow rate sensor which is a fourth embodiment of the present invention.
Figure 14:
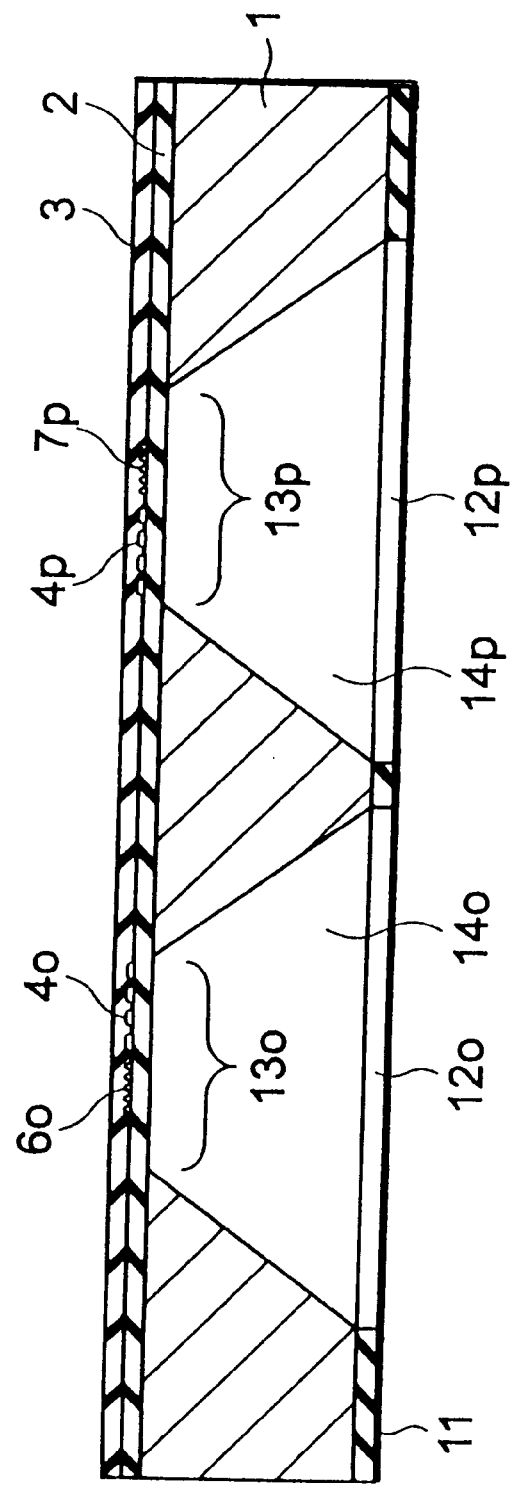
FIG. 14 is a sectional view taken in the direction of arrows on line XIV—XIV of FIG. 13.
Figure 15:
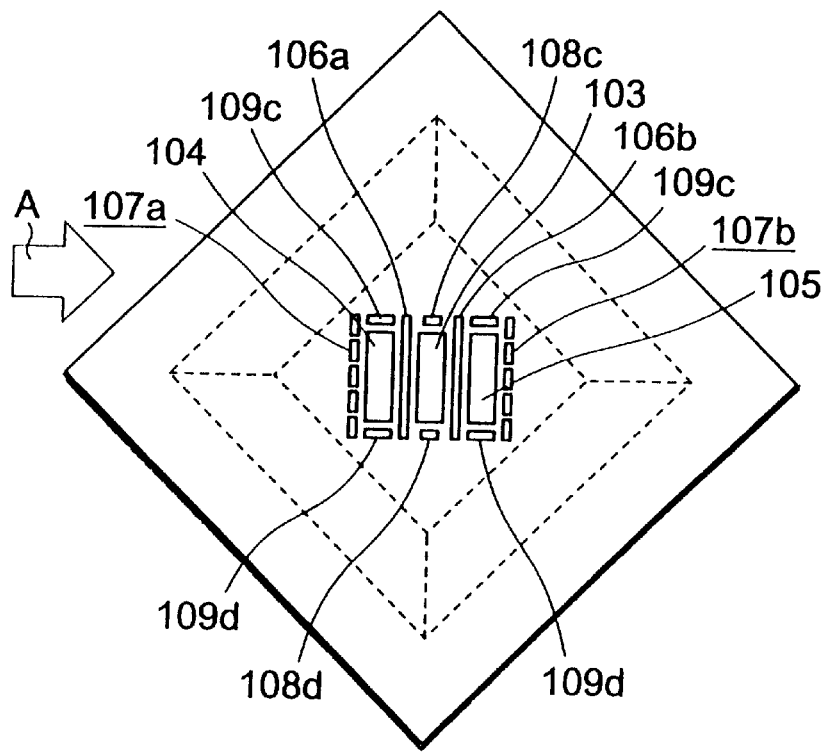
FIG. 15 is a plan view of the conventional flow rate detecting device.
Figure 16:
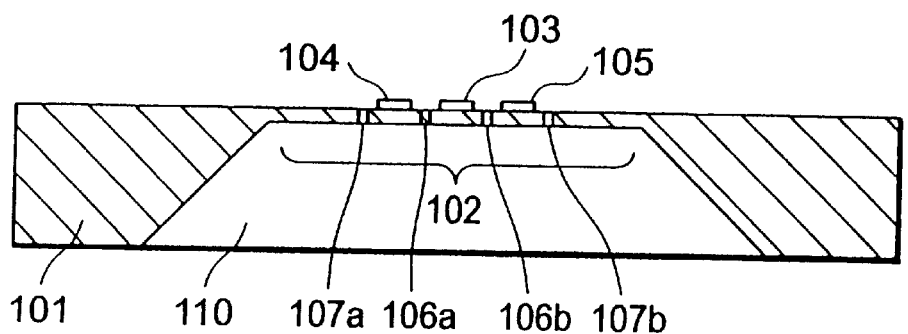
FIG. 16 is a sectional view of the conventional flow rate detecting device.

FIG. 13 is a plan view of a flow rate detecting device used in a thermo-sensitive flow rate sensor which is a fourth embodiment of the present invention. FIG. 14 is a sectional view taken in the direction of arrows on line XIV—XIV of FIG. 13. Incidentally, reference characters 1 to 3, 5, 8a to 8h and 9a to 9h designate the corresponding composing elements of the first embodiment.

In the case of the fourth embodiment, first, a supporting film 2, heater resistors 4o and 4p serving as heating portions, temperature detecting resistors 6o and 6p serving as the temperature detecting portions, a fluid temperature detecting resistor 5, lead patterns 8a to 8h and a protective film 3 are formed on the plate-like substrate 1 by a method similar to the method described in the description of the first embodiment. Subsequently, a back surface protecting film 11 constituted by an oxide film is formed on a surface opposite to the surface on which the supporting film 2 of the plate-like substrate 1 is formed. Then, etching holes 12o and 12p are formed by partly removing the back surface protecting film 11 by a photolithographic method. Thereafter, alkali etching is performed on this substrate. Then, cavities 14o to 14p are formed by removing parts of the plate-like substrate 1, which are exposed from the etching holes 12, in such a way as to reach the supporting film 2. Consequently, a longer side of each of the flow rate detecting diaphragms 13o and 13p extends along the direction perpendicular to the direction A of the flow of the fluid to be measured and the diaphragms 13o and 13p are arranged in the direction A of the flow of the fluid to be measured. Incidentally, the diaphragm 13o is placed at the upstream side of the diaphragm 13p.

Further, the diaphragm 13o has the heater resistor 4o serving as the heating portion, and the temperature detecting resistor 6o serving as the temperature detecting portion formed at the upstream side of the heater resistor 4o. The diaphragm 13p has the heater resistor 4p serving as the heating portion, and the temperature detecting resistor 6p serving as the temperature detecting portion formed at the downstream side of the heater resistor 4p. Furthermore, the heater resistors 4o and 4p are connected in series.

Moreover, the flow rate detecting diaphragms 13o and 13p are configured so that the length of the longer side of each of these diaphragms is twice the length of the shorter side thereof or longer and that the thickness of each of these diaphragms is not more than 1 $\mu$m.

Figure 17:
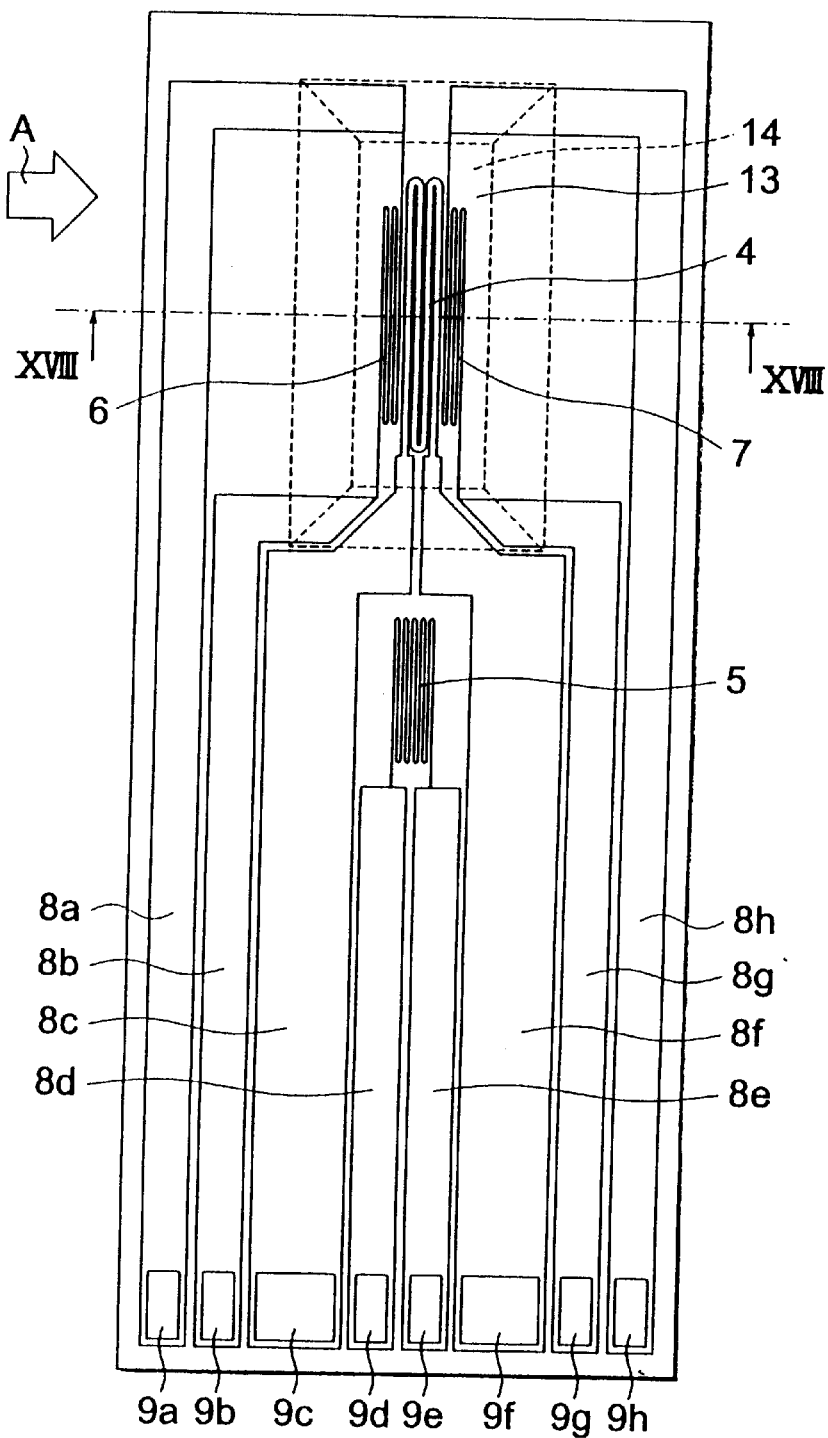
FIG. 17 is a plan view of a flow rate detecting device which is a comparative example.
Figure 18:
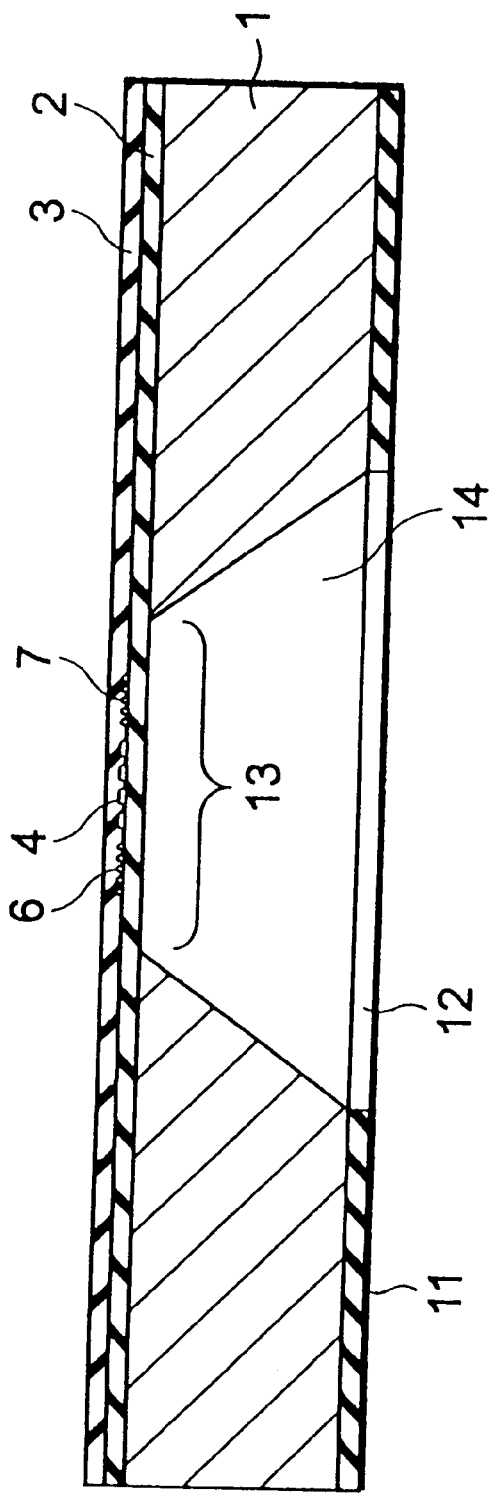
FIG. 18 is a sectional view taken in the direction of arrows on line XVIII—XVIII of FIG. 17.

FIGS. 17 and 18 are a plan view and a side sectional view of a flow rate detecting device, which is a comparative example corresponding to the fourth embodiment. In FIGS. 17 and 18, reference characters 1 to 3, 5, 8a to 8h and 9a to 9h designate the corresponding composing elements of the first embodiment.

In the case of this comparative example, the longer side of the diaphragm 13 extends in a direction perpendicular to the direction A of the flow of the fluid to be measured. Thus, this comparative example has an advantage in that the flow rate of a fluid is measured in a wide range in the direction perpendicular to the direction A of the flow of the fluid. However, three resistor patterns of the heating resistor 4, the upstream-side temperature detecting resistor 6 and the downstream-side temperature detecting resistor 7 are arranged on the single diaphragm 13 in the direction of the flow of the fluid to be measured. Thus, the width of the diaphragm in the direction of the flow of the fluid to be measured is wide. Thus, it is necessary for securing the strength of the diaphragm 13 to increase the thickness thereof. Consequently, sufficient responsibility is not obtained.

In the case of the fourth embodiment, it is sufficient for securing the strength of a diaphragm that two thermo-sensitive resistors, namely, the heating portion and the temperature detecting portion are disposed on a single diaphragm. Thus, the strength of the diaphragm is increased by decreasing the width thereof.

Incidentally, the relation between the strength of the diaphragm and the ratio of the length of the longer side to the length of the shorter side of the diaphragm, and the relation between the deflection caused in the diaphragm and such a ratio are the same as the relations described in the description of the first embodiment.

The thickness of the diaphragm is decreased because the strength thereof can be increased. If the thickness of the diaphragm is not more than 1 $\mu$m, the flow rate sensor achieves a thermal response, by which the sensor can follow the pulsation of air flow to an automobile internal combustion engine.

Furthermore, the heater resistors 4o and 4p are connected in series. Thus, even when a plurality of heater resistors are provided in the device, the sensor requires only one heating current control circuit. Further, the heater resistors 4o and 4p are connected in series. Thus, when a positive direction flow of a fluid to be measured is caused, the temperature of the heater resistor 4o tends to become lower than the temperature of the heater resistor 4p. Therefore, in comparison with the case that the heater resistors 4o and 4p are connected in parallel, the difference in temperature between the heater resistors 6o and 6p is large. Consequently, the fourth embodiment has an advantage in that the sensitivity of the flow rate sensor is high.

The flow rate sensor of the present invention is configured as describe above, and thus has the following advantageous effects.

Namely, according to an aspect of the present invention, there is provided a thermo-sensitive flow rate sensor including a flow rate detecting device that has a plurality of flow rate detecting diaphragms, each of which is provided with heating portions and temperature detecting portions. The plurality of flow rate detecting diaphragms are arranged in a direction perpendicular to a direction of flow of a fluid to be measured. Each of the flow rate detecting diaphragms is formed and placed so that the length of a longer side thereof is two times the length of a shorter side or more, and that the longer side thereof extends along the direction of flow of the fluid to be measured. Each of the flow rate detecting diaphragms has at least one of the heating potions and at least one of the temperature detecting portions, which are arranged in the direction of flow of the fluid to be measured.

Thus, the size of each of the diaphragms is reduced, so that the strength thereof is increased. Further, even when the longer side of the diaphragm is extended, a reduction in strength thereof is small. Consequently, the strength of the diaphragm is increased still more. Moreover, a highly reliable thermo-sensitive flow rate sensor is obtained.

Further, the diaphragm can have a relatively wide width in the direction of flow of a fluid to be measured. Thus, the sensor allows a relatively large difference in temperature between the upstream-side and downstream-side temperature detecting portions. Consequently, a highly thermo-sensitive flow rate sensor is obtained.

Furthermore, a plurality of diaphragms are provided in such a manner as to be arranged in a direction perpendicular to the direction of the flow of the fluid to be measured. Thus, the average flow velocity in the direction perpendicular to the direction of flow of a fluid to be measured can be measured. Thus, a thermo-sensitive flow rate sensor with high flow-rate detecting accuracy is obtained.

Moreover, the heating portion and the temperature detecting portions respectively placed at the upstream-side and downstream-side of the heating portion are provided in each of the flow rate detecting diaphragms. Thus, signals respectively indicating the temperatures in parts at the upstream side and the downstream side of the heating portion are obtained. Consequently, the detecting sensitivity of the sensor is enhanced.

Further, the thickness of the flow rate detecting diaphragm is not more than 1 $\mu$m. Thus, the sensor of the present invention achieves the responsibility by which the sensor can follow a pulsation of airflow to an automobile internal combustion engine.

Moreover, the heating portion provided on the flow rate detecting is constituted by a thermo-sensitive resistor. Furthermore, the thermosensitive resistors of each of the heating portions are connected in series or in parallel. Thus, there is no necessity for providing a plurality of heating current control circuits in the sensor. Consequently, the manufacturing cost of the sensor is reduced.

Additionally, each of the temperature detecting portions provided on the flow rate detecting diaphragms is constituted by thermo-sensitive resistors. The thermo-sensitive resistors of each of the temperature detecting portions are connected in series or in parallel. Thus, the sensor needs only a pair of upstream-side and downstream-side temperature signal detecting circuits of the temperature detecting portion. Consequently, the manufacturing cost of the sensor is reduced.

Besides, the flow rate detecting diaphragms include diaphragms, each of which has a heating portion and a temperature detecting portion disposed at the upstream side of the heating portion, and diaphragms, each of which has a heating portion and a temperature detecting portion disposed at the downstream side of this heating portion. Thus, the length of the longer side of each of the diaphragms is reduced. Consequently, the strength of each of the diaphragms is increased.

Further, in each of the flow rate detecting diaphragms, the longer side portion is constructed by partly removing the plate-like substrate in the direction perpendicular to the surface of the substrate. Thus, many diaphragms are disposed so that these diaphragms are placed in a direction orthogonal to the direction of flow of a fluid to be measured and that adjacent ones of the diaphragms are disposed closely to each other. Consequently, a detection region is enlarged, and the detecting accuracy and sensitivity of the sensor are enhanced.

Furthermore, according to another aspect of the present invention, there is provided a thermo-sensitive flow rate sensor including a flow rate detecting device that has flow rate detecting diaphragms, each of which has a heating portion and a temperature detecting portion. The flow rate detecting diaphragms are arranged in the direction of flow of a fluid to be measured. Each of the flow rate detecting diaphragms is formed and placed so that the length of a longer side thereof is two times a length of a shorter side or more, that the longer side thereof extends in a direction perpendicular to the direction of flow of the fluid to be measured, and that the thickness thereof is not more than 1 $\mu$m. An upstream-side one of the flow rate detecting diaphragms has the corresponding heating portion and the corresponding temperature detecting portion placed at an upstream side thereof. A downstream-side one of the flow rate detecting diaphragms has the corresponding heating portion and the corresponding temperature detecting portion placed at a downstream side thereof. Each of the heating portions comprises thermo-sensitive resistors. The thermo-sensitive resistors of each of the heating portions are connected in series or in parallel. This sensor uses a signal representing an amount corresponding to the difference in temperature between the temperature detecting portion provided in the upstream-side flow rate detecting diaphragm and the temperature detecting portion provided in the downstream-side flow rate detecting diaphragm as a flow rate signal.

Thus, each of the diaphragms needs only two thermo-sensitive resistors, namely, the heating portion and the temperature detecting portion. Consequently, the width of each of the diaphragms is reduced. Moreover, the strength of each of the diaphragms is increased. Thus, a highly reliable thermo-sensitive flow rate sensor is obtained.

Further, the thickness of each of the diaphragms is not more than 1 $\mu$m. Thus, the present invention provides a thermo-sensitive flow rate sensor having responsibility by which the sensor can follow a pulsation of airflow to an automobile internal combustion engine.

Although the preferred embodiments of the present invention have been described above, it should be understood that the present invention is not limited thereto and that other modifications will be apparent to those skilled in the art without departing from the sprint of the invention.

The scope of the present invention, therefore, should be determined solely by the appended claims.

What is claimed is:

1. A thermo-sensitive flow rate sensor comprising:

a flow rate detecting device having a plurality of flow rate detecting diaphragms thereon, each flow rate detecting diaphragm provided with heating portions and temperature detecting portions thereon, wherein said plurality of flow rate detecting diaphragms are arranged in a direction perpendicular to a direction of flow of a fluid to be measured, wherein each of said flow rate detecting diaphragms is formed and placed so that a length of a longer side thereof is at least two times a length of a shorter side, and wherein the longer side thereof extends along the direction of flow of the fluid to be measured, and wherein each of said flow rate detecting diaphragms has at least one of said heating portions and at least one of said temperature detecting portions, said heating portions and said temperature portions being arranged along a direction of flow of said fluid to be measured.

2. The thermo-sensitive flow rate sensor according to claim 1, wherein each of said flow rate detecting diaphragms has a corresponding one of said heating portions and a corresponding pair of said temperature detecting portions respectively located at an upstream-side and a downstream-side of said corresponding one of said heating portions.

3. The thermo-sensitive flow rate sensor according to claim 1, wherein a thickness of each of said flow rate detecting diaphragms is not more than 1 $\mu$m.

4. The thermo-sensitive flow rate sensor according to claim 1, wherein said heating portion provided in each of said flow rate detecting diaphragms comprises thermo-sensitive resistors, and wherein said thermo-sensitive resistors of each of said heating portions are connected in series or in parallel.

5. The thermo-sensitive flow rate sensor according to claim 1, wherein said temperature detecting portion provided in each of said flow rate detecting diaphragms comprises thermo-sensitive resistors, and wherein said thermo-sensitive resistors of each of said temperature detecting portions are connected in series or in parallel.

6. The thermo-sensitive flow rate sensor according to claim 1, wherein said flow rate detecting diaphragms include:

diaphragms each of which has a corresponding one of said heating portions and a corresponding first of said temperature detecting portions, wherein said first temperature detecting portion is placed at an upstream side of said corresponding one of said heating portions; and diaphragms each of which has a corresponding one of said heating portions and a corresponding second of said temperature detecting portions, wherein said second temperature detecting portion is placed at a downstream side of said corresponding one of said heating portions.

7. The thermo-sensitive flow rate sensor according to claim 1, wherein the longer side portions of each of said flow rate detecting diaphragms are formed by removing a corresponding portion of a substantially planar substrate in a direction perpendicular to a surface of said substantially planar substrate.

8. A thermo-sensitive flow rate sensor comprising:
   a flow rate detecting device having flow rate detecting diaphragms thereon, each flow rate detecting diaphragm having a heating portion and a temperature detecting portion thereon,
   wherein said flow rate detecting diaphragms are arranged in a direction of flow of a fluid to be measured,
   wherein each of said flow rate detecting diaphragms is formed and placed so that a length of a longer side thereof is at least two times a length of a shorter side, wherein the longer side thereof extends in a direction perpendicular to the direction of flow of the fluid to be measured, and wherein a thickness thereof is not more than 1 $\mu$m,
   wherein one of said flow rate detecting diaphragms is located at an upstream-side of said flow rate detecting device and has a first corresponding heating portion and a first corresponding temperature detecting portion, wherein said first temperature detecting portion is placed at an upstream side thereof
   wherein the other of said flow rate detecting diaphragms is located at a downstream-side of said flow rate detecting device and has a second corresponding heating portion and a second corresponding temperature detecting portion, wherein said second temperature detecting portion is placed at a downstream side thereof,
   wherein each of said heating portions comprises thermo-sensitive resistors,
   wherein said thermo-sensitive resistors of each of said heating portions are connected in series or in parallel, and
   wherein a signal representing an amount corresponding to a difference in temperature between said temperature detecting portion provided in said upstream-side flow rate detecting diaphragm and said temperature detecting portion provided in said downstream-side flow rate detecting diaphragm is used as a flow rate signal.

* * * * *